(12) United States Patent
Al-Bagoury et al.

(10) Patent No.: US 8,668,772 B2
(45) Date of Patent: Mar. 11, 2014

(54) SLURRY OF MANGANOMANGANIC OXIDE PARTICLES AND METHOD FOR THE PRODUCTION OF SLURRY

(75) Inventors: Mohamed Al-Bagoury, Kristiansand (NO); Frank Vidar Rostol, Kristiansand (NO)

(73) Assignee: Elkem AS, Oslo (NO)

( * ) Notice: Subject to any disclaimer, the term of this patent is extended or adjusted under 35 U.S.C. 154(b) by 0 days.

(21) Appl. No.: 13/824,092

(22) PCT Filed: Sep. 14, 2011

(86) PCT No.: PCT/NO2011/000250
§ 371 (c)(1),
(2), (4) Date: Aug. 13, 2013

(87) PCT Pub. No.: WO2012/036560
PCT Pub. Date: Mar. 22, 2012

(65) Prior Publication Data
US 2013/0319295 A1 Dec. 5, 2013

(30) Foreign Application Priority Data
Sep. 17, 2010 (NO) .................................. 20101299

(51) Int. Cl.
C04B 14/30 (2006.01)
C09K 8/03 (2006.01)
C09K 8/46 (2006.01)
C01G 45/02 (2006.01)
C09C 3/08 (2006.01)
C09C 3/10 (2006.01)

(52) U.S. Cl.
USPC ....... 106/287.18; 106/401; 106/505; 106/810

(58) Field of Classification Search
USPC .............................. 106/287.18, 401, 505, 810
See application file for complete search history.

(56) References Cited

U.S. PATENT DOCUMENTS

| 4,417,007 | A | * | 11/1983 | Salensky et al. ............... 523/442 |
| 4,469,521 | A | * | 9/1984 | Salensky ........................ 106/425 |
| 4,480,064 | A | * | 10/1984 | Chopra et al. ................. 524/413 |
| 4,788,411 | A | * | 11/1988 | Skinner .......................... 219/127 |
| 4,814,389 | A | | 3/1989 | Garvey et al. |
| 5,007,480 | A | | 4/1991 | Anderssen |
| 5,942,469 | A | | 8/1999 | Juprasert et al. |
| 6,668,927 | B1 | | 12/2003 | Chatterji et al. |
| 7,470,419 | B2 | * | 12/2008 | Soyland Hansen ........... 423/605 |
| 2004/0127366 | A1 | | 7/2004 | Bradbury et al. |
| 2004/0157749 | A1 | | 8/2004 | Ely et al. |
| 2008/0107513 | A1 | * | 5/2008 | Curtis et al. ................... 414/676 |
| 2009/0239173 | A1 | * | 9/2009 | Kobayashi et al. ...... 430/111.31 |

FOREIGN PATENT DOCUMENTS

| CA | 1 180 974 | | 1/1985 |
| EP | 1776435 A1 | | 4/2007 |
| GB | 2101109 A | * | 1/1983 |
| GB | 2103218 A | * | 2/1983 |
| GB | 2113664 A | * | 8/1983 |
| WO | WO 2008/103596 A1 | | 8/2008 |

OTHER PUBLICATIONS

Translation of Office Action dated Oct. 13, 2012 in Norwegian Patent Appln. No. 20101299.
Translation of Office Action dated Oct. 13, 2011 in Norwegian Patent Appln. 20101299.

* cited by examiner

*Primary Examiner* — Anthony J Green
(74) *Attorney, Agent, or Firm* — Lucas & Mercanti, LLP

(57) ABSTRACT

A stable non-settling slurry of water and manganomanganic oxide particles having a particle size below 10 μm. The slurry comprises water and up to 92 wt % manganomanganic oxide particles bade on the weight of the slurry. The slurry has a pH between 9 and 11 and contains 0.05 to 0.5 wt % of a dispersant based on the weight of dry manganomanganic oxide particles. The dispersant can be an ethoxylated polycarboxylate or a polyacrylic acid salt and has a molecular weight between 500 and 50 000 g/mol.

13 Claims, 4 Drawing Sheets

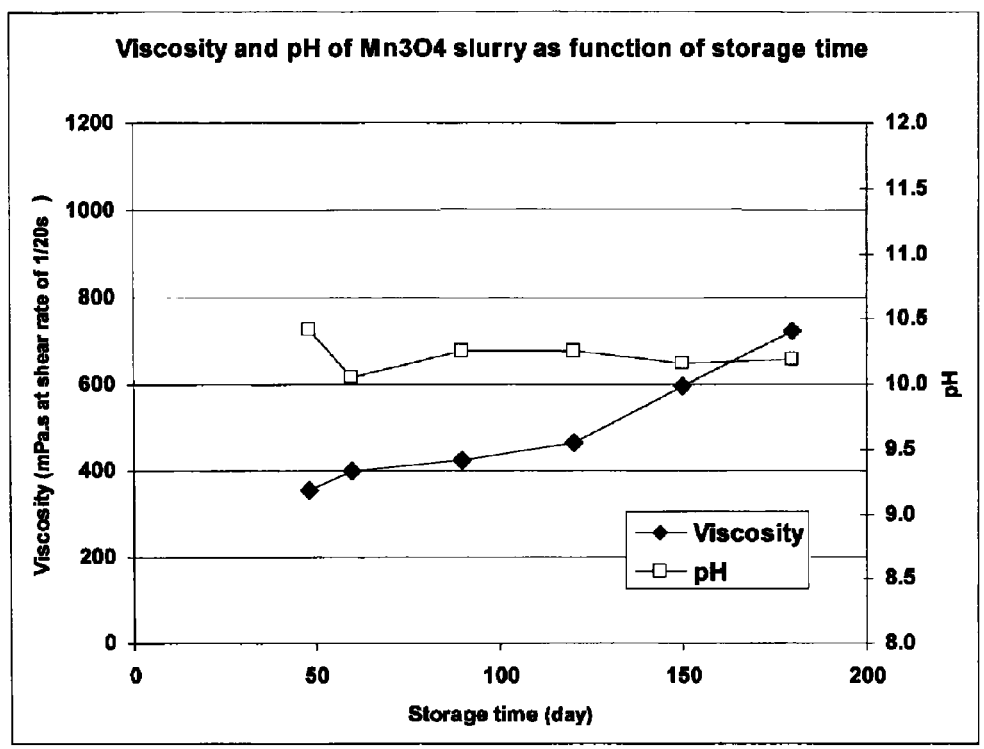
Figure 1: Viscosity and pH of manganomanganic oxide slurry with a solid load of 90wt% as function of storage time. Antiprex A was used as dispersant and NaOH was used as pH regulator.

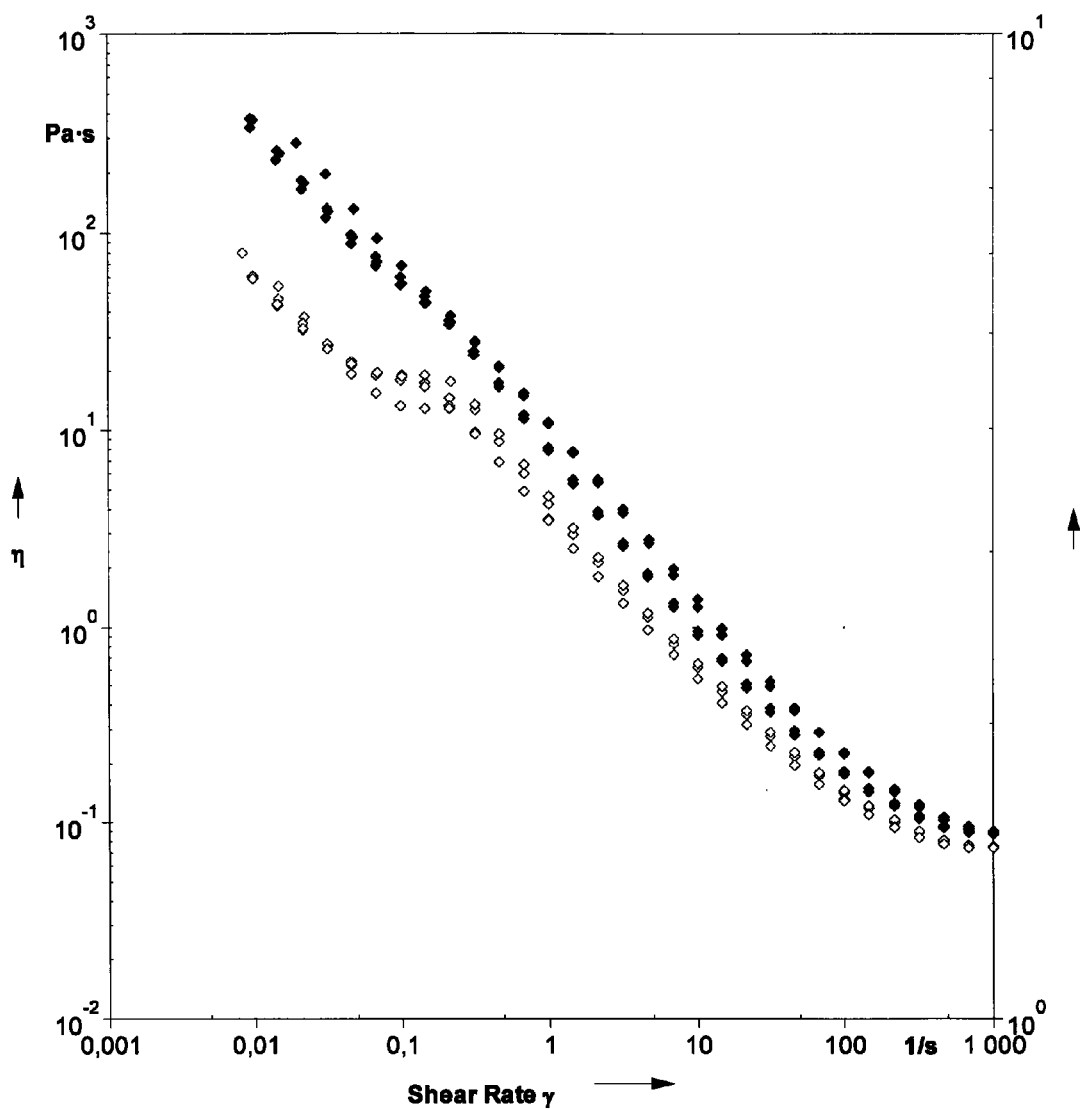
Figure 2: The viscosity of 90wt% manganomanganic oxide slurry prepared by using 1.6g Melpers 9360 (solid symbol) and 0.8g antiprex A (open symbol) at pH 10.5. Melpers 9360 is an aqueous solution with active material concentration of 60wt%.

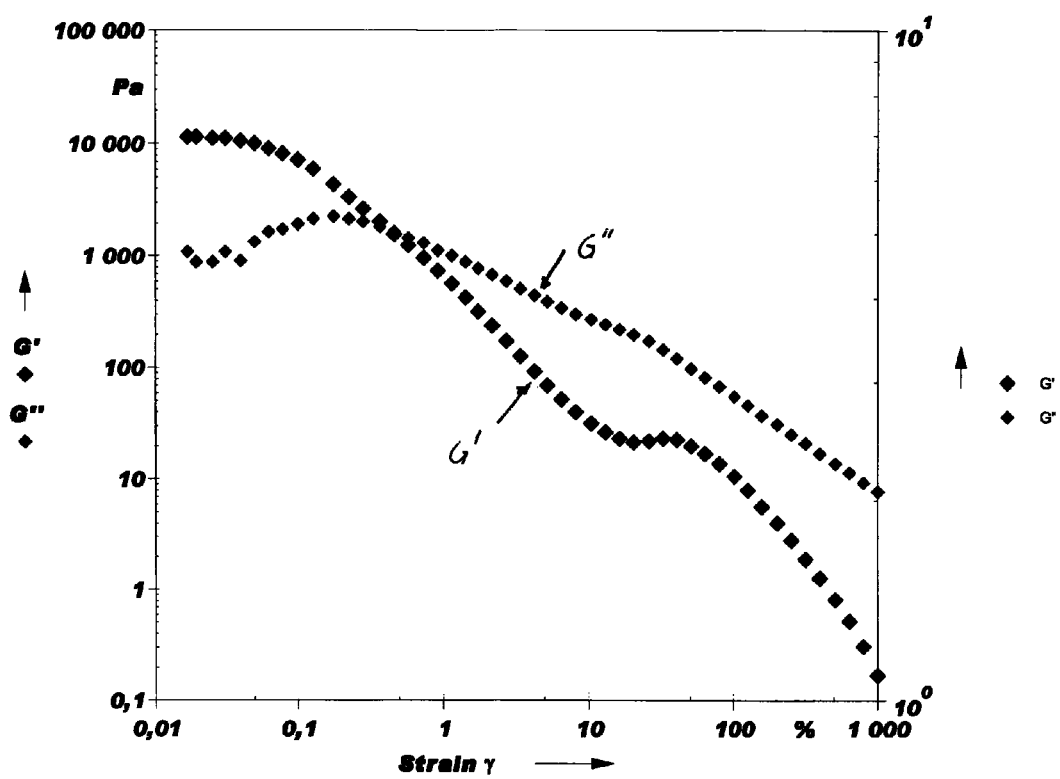
Figure 3: dynamic rheology of high solid load manganomanganic oxide slurry prepared by using 1.6g Melpers 9360 at pH 10.5. The total slurry mass was 1kg. Melpers 9360 is an aqueous solution with active material concentration of 60wt%. G' is the storage (elastic) modulus module and G" is the loss (viscous) modulus

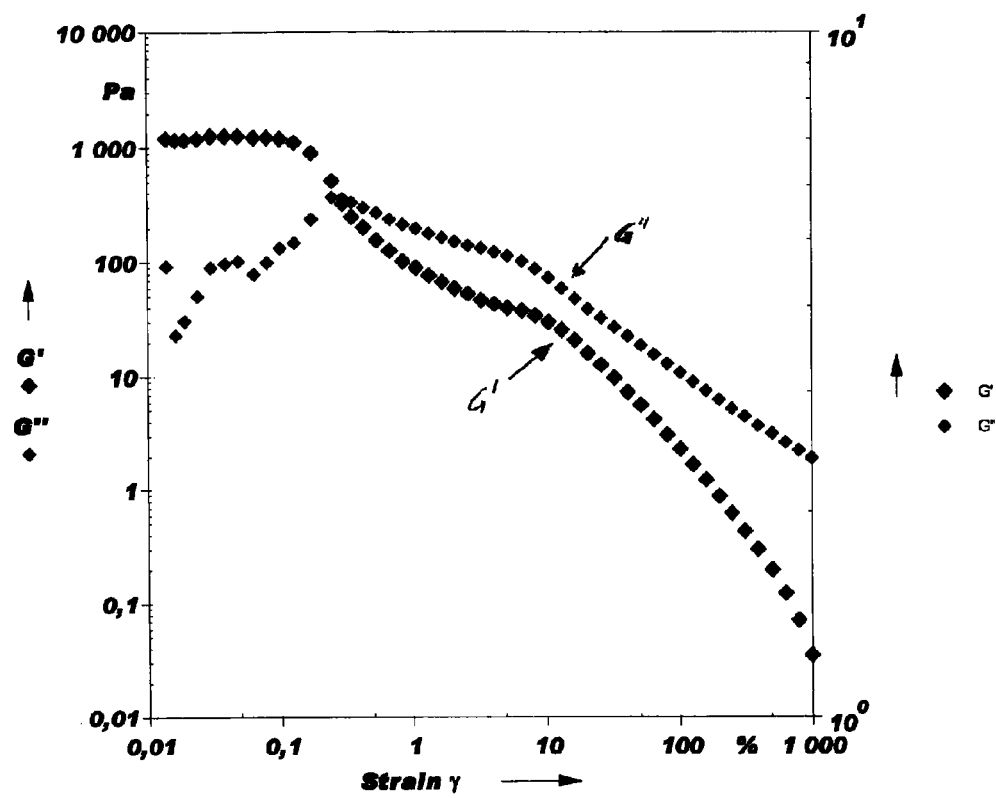
Figure 4: dynamic rheology of high solid load manganomanganic oxide slurry prepared by using 0.8g Antiprex A at pH 10.5. The total slurry mass was 1kg.

SLURRY OF MANGANOMANGANIC OXIDE PARTICLES AND METHOD FOR THE PRODUCTION OF SLURRY

CROSS-REFERENCE TO RELATED APPLICATIONS

This application is a 371 of PCT/NO2011/000250, filed Sep. 14, 2011, which claims the benefit of NO Patent Application No. 20101299, filed Sep. 17, 2010, the contents of each of which are incorporated herein by reference.

TECHNICAL FIELD

The present invention relates to a slurry of manganomanganic oxide particles and to a method for the production of such slurries.

BACKGROUND ART

U.S. Pat. No. 5,007,480 discloses drilling mud and oil well cement slurries for different purposes such as well cementing, completion fluids, packer fluids, drilling fluids, isolation fluids and other related fluids containing manganomanganic oxide particles as a weight agent. The particle size of the manganomanganic oxide particles is generally below 10 microns with an average particle diameter less than 1 micron.

One drawback with the use of the manganomanganic oxide particles disclosed U.S. Pat. No. 5,007,480 is the poor flow characteristics of the dry particles. Both for offshore and on-shore use of the manganomanganic oxide particles, it would be convenient to use silos for handling and storing the material. However, due to the poor flow characteristics of the material, it is difficult to discharge the material from silo-trucks, silos of delivery boats or stationary silos because the fine particles tend to form bridges in silos and handling systems, particularly in the presence of moisture.

For the same reasons, clearly, metering and feeding of the material into drilling mud and oil well cement slurries from a silo of any size by the use of screw conveyors or vibrating devices is inaccurate and unreliable, or sometimes even impossible.

The manganomanganic oxide particles lose their flowability after handling and may no longer flow freely after being stored at a site, even for a short time. This may require substantial human effort to remove material from a blocked silo, unless the silo is specially designed and fully equipped with special and expensive devices to handle sticky materials. In some instances, the material may therefore also be difficult to move over longer distances using pneumatic transport systems, as are commonly used in the industry.

Material handled in big bags shows a similar lack of flowability, and emptying a big bag through a bottom spout might become impossible with the result that the whole bottom of the bag might need to be cut away to get the material out.

In order to solve flowing and dusting problems of the manganomanganic particles, it is proposed in EP 1776435 B1 to make spray dried granules by first making a liquid slurry (containing 5-35% by weight of manganomanganic oxide, water and at least one water-reducing agent, and/or at least one binder agent and/or at least one dispersing agent) and spray drying the slurry to provide granules. The granules can then later be re-dispersed in water or oil when used for drilling muds or oil well cement slurries. The method of EP 1776435 does however have the disadvantages that the spray drying process requires a significant amount of energy, and that it sometimes can be difficult to re-disperse the granules fully into individual particles.

The manganomanganic oxide particles comprise at least 90% by weight of manganomanganic oxide ($Mn_3O_4$), the reminder being calcium oxide, magnesium oxide and preferably less than 1% by weight of elemental manganese. The density of the manganomanganic oxide particles is between 4.7 and 4.9 g/cm$^3$ and they have a particle size of at least 98% below 10 µm.

DESCRIPTION OF THE INVENTION

It is an object of the present invention to provide a better solution to the flow and dusting problems associated with the manganomanganic oxide particles and to avoid the energy need associated with the method of making spray-dried granules disclosed in EP 1776435.

The present invention thus relates to a stable non-settling slurry of water and manganomanganic oxide particles having a particle size below 10 µm, wherein the slurry comprises water and up to 92 wt % manganomanganic oxide particles based on the weight of the slurry, and wherein: the slurry has a pH between 9 and 11 and contains 0.05 to 0.5 wt % of a dispersant based on the weight of dry manganomanganic oxide particles, selected from an ethoxylated polycarboxylate and a polyacrylic acid salt, the dispersant having a molecular weight between 500 and 50 000 g/mol.

The benefits of using manganomanganic oxide in slurry form, as opposed to powder form, include:
- handling a product in liquid form is easier than in a powder form;
- a slurry disperses more effectively in cement or drilling fluids than a powder;
- less shear energy is required to incorporate manganomanganic oxide slurry into cement slurry or drilling fluids;
- controlling the added quantities of slurry is easier than the for powder;
- handling of slurry is much safer than handling very fine dusty powder material;
- no lifting of big bags is required in the case of slurry;
- the bulk density of the high solid load slurry (about 3.5 Ton/m$^3$) is much higher than the bulk density of the powder (about 1 Ton/m$^3$) and this allows the use of lower deck space on a drilling rig;
- automated liquid partitioning systems may be used during the cementing operations.

The use of manganomanganic oxide according to the invention, with its chemical and physical properties, enables a high solid load slurry to be produced.

In particular, manganomanganic oxide has a high specific gravity of 4.8 g/cm$^3$, a small particle size with a average D50 of about 1 µm, and a low specific surface area in the range 1 to 4 m$^2$/g. A weight % of 90 for manganomanganic oxide slurry is equivalent to 65 vol %, which is below the critical volume concentration of solid particles in dispersion.

Manganomanganic oxide fume has an isoelectric point around pH 6, i.e., manganomanganic oxide has a zero zeta potential around pH 6. Therefore, the surface of manganomanganic oxide at pH 6 is neutral and above that pH, the surface will have a negative charge due to the accumulation and the ionization of the hydroxyl group on the surface of the $Mn_3O_4$. Below pH 6, the surface becomes positively charged due to the accumulation of the hydronium ion ($H_3O^+$) on the surface of the particles.

The isoelectric point of manganomanganic oxide may vary slightly depending on the processing circumstances of the ferromanganese production, such as the mode of furnace operation and the quality of the raw materials.

TABLE 1

Typical chemical composition of $Mn_3O_4$ fume estimated by XRF method

| Component | Content in (%) wt |
|---|---|
| [Mn] | 69.25 |
| [$Mn_3O_4$] | 96.12 |
| [$Fe_2O_3$] | 2.75 |
| [$SiO_2$] | 0.027 |
| [PbO] | 0.07 |
| [ZnO] | 0.1 |
| [$Al_2O_3$] | 0.004 |
| [CaO] | 0.007 |
| [MgO] | 0.21 |
| [$K_2O$] | 0.005 |
| [$P_2O_5$] | 0.077 |
| [$As_2O_3$] | 0.003 |
| [$Na_2O$] | 0.02 |
| [$SO_3$] | 0.016 |
| [CoO] | 0.01 |
| [BaO] | 0.002 |
| Sp. gravity (kg/$dm^3$) | 4.82 |
| Sp. surface ($m^2$/g) | 2.8 |

A typical chemical composition of $Mn_3O_4$ fume measured by XRF method is shown in Table 1. $Mn_3O_4$ fume contains to a varied extent some metal oxide impurities such as $Fe_2O_3$, ZnO, $Al_2O_3$, MgO, and $SiO_2$ etc. The pH of $Mn_3O_4$ fume varies in the range from 6 to 12, depending on the metal oxides content. Manganomanganic oxide fume exhibits a low charge density as measured by the zeta potential compared to other metal oxides such as silica. This makes the slurrification of manganomanganic oxide much easier than other metal oxides. Manganomanganic oxide slurry shows better long term stability due to the low particle-particle interaction.

Various dispersants were tested for their effectiveness in producing a stable high load manganomanganic oxide slurry. Those tested included:

1) Lignosluphonate (Borresperse Na, Ultrazine Na, Solus 5 from Borregaard Ligno Tech), a lignin based anionic dispersant with a wide variety of purities and molecular weights and its salt form. In addition to the negative charge (as an anionic dispersant), ligonsulphonate, also exhibits a branched structure that provides steric stability;
2) Polyacrylate and polycarboxylate (Antiprex A, Antiprex 461 and Antiprex 62L from Ciba Specialty Chemicals), a linear polyacrylic acid anionic type of dispersant. It exists in the form of a sodium or ammonium salt;
3) Modified polycarboxylate such as polyether polycarboxylate (Castament FS 20, Castament FS 40, Castament VP 95L, Melpers 0030, Melpers 3400, Melpers 5344, Melpers 9360 from BASF and Geropon T36 from Rhodia);
4) Modified polysaccharide (modified starch ether);
5) Copolymer of acrylic acid and vinyl phosphonic acid (Albritect CP30 from Rhodia)
6) Neutralized phosphonocarboxylic acid (Mirapol A400 from Rhodia)
7) Polyoxyethylenalkyd phosphate ester (Rhodafac RA600), a biodegradable linear alcohol ethoxylate phosphate ester.
8) Sulphonated naphthalene and melamine formaldehyde, commonly known as superplastisizer in the construction industry and widely used as dispersant in oil well cementing.

Most of these dispersants exhibit anionic character to increase the electrostatic repulsive forces between the particles which in turn provides a sufficient stabilization. However, out of more than 25 dispersants investigated, only two of the dispersants produced a stable 90 wt % slurry. These were: firstly the dispersant Antipex A from Ciba Chemicals, which is polyacrylic acid sodium salt with a molecular weight in the region of 3000 g/mol, and is an anionic dispersant, and the dispersant Melpers 9360 produced by BASF, which belongs to the class of exthoxylated polycarboxylates, i.e. a modified polycarboxylic acid with a hydrophobic chain as a side chain. This second dispersant can be considered as a graft copolymer. The negative charge of the polymer main chain is adsorbed on the surface of manganomanganic oxide via the counter ion in the medium and the hydrophobic part is oriented to the aqueous phase and builds a steric barrier between the particles.

Preferably the slurry contains more than 80 wt % manganomanganic oxide particles based on the weight of the slurry.

The content of dispersant is preferably between 0.07 and 0.15 wt % based on the weight of the manganomanganic oxide particles.

One preferred dispersant is polyacrylic sodium salt with a molecular weight of about 3000 s/mol.

Another preferred dispersant is exthoxylated polycarboxylate with a hydrophobic chain as a side chain and a molecular weight of ca. 20000 g/mol.

With regard to the pH range, the optimal pH range is from 9 to 11 and more preferably from 9.5 to 10.5. This optimal pH range depends on the surface chemistry of manganomanganic oxide and the amount of the combined impurities.

For pH regulation or adjustment, any metal hydroxides, particularly the water soluble hydroxides such as sodium hydroxide (NaOH), potassium hydroxide (KOH) and ammonium hydroxide ($NH_4OH$) can be used. Preferably, sodium hydroxide is used. The pH regulator can be added as powder or as liquid.

The dispersant concentration depends on the type of dispersant, pH, the source of manganomanganic oxide fume and the solid load of the slurry. The dispersant can be added as solid or liquid.

Manganomanganic oxide slurries with a solids loading up to 75 wt % are commercially available, but the present invention seeks to increase this figure significantly. Using the present invention, it is possible to prepare slurries with a solids content from 0.01 to 92 wt %. It has been found that for slurries with a solids loading of <80 wt %, it is necessary to adjust the amount of dispersant to achieve viscosity in the region of 500 mPa·s. In accordance with the invention, a way to produce stable manganomanganic oxide slurry is to adjust the viscosity by adding dispersant and/or pH by adding alkaline solution to create a rheology that makes the slurry flowable and at the same time non-settable. The amount of the dispersant and the pH regulator required will depend on the slurry solid loading.

The process of producing manganomanganic oxide slurry enables the removal of 1 to 4 wt % of coarse particles >45 μm via a wet sieving method. Coarse particles cause undesirable effects on both the slurry stability and the end application, particularly in completion drilling fluids. By pumping the slurry after preparation through a wet sieve system the large particles can be removed and this will improve the stability and properties of the slurry.

The invention also extends to a method of producing a stable non-settling aqueous slurry of manganomanganic oxide, comprising: mixing together manganomanganic oxide particles, water and a dispersant, the manganomanganic oxide representing up to 92 wt % of the slurry and the dispersant representing 0.05 to 0.5 wt % based on the weight of the dry manganomanganic oxide particles, and adjusting the pH of the slurry to a value in the range 9 to 11, the dispersant being selected from an ethoxylated polycarboxylate and polyacrylic acid salt, the dispersant having a molecular weight between 500 and 50 000 g/mol.

The manganomanganic oxide slurry is prepared by adding dispersant to water was added and mixed at low speed of ca 2000 rpm. The desired amount of sodium hydroxide is added. Manganomanganic is the added into the liquid medium at a low mixing rate and after adding all the manganomanganic powder a high shear mixing of ca.10000 rpm is applied for 2 min.

For large scale mixing a high shear mixer equipped with rotor-stator or a tooth shear plate (impeller) is employed using the above mixing mode.

The invention also extends to products which incorporate the slurry of the invention, such as an oil well cement or a drilling fluid.

According to such an aspect of the invention, there is provided an oil well cement composition, comprising cement powder, water and a manganomanganic oxide slurry according to the invention and optionally microsilica, a fluid loss additive, a retarder, and silica flour.

According to another aspect, there is provided a water-based drilling fluid composition, comprising water and a manganomanganic oxide slurry according to the invention and optionally $NaHCO_3$ (sodium bicarbonate), $CaCO_3$ (calcium carbonate), a viscosifier, a dispersant and a fluid loss additive.

The invention also extends to methods of producing such products incorporating the manganomanganic oxide slurry.

SHORT DESCRIPTION OF DRAWINGS

FIG. 1 shows a diagram for viscosity and pH as function of storage time for a manganomanganic oxide slurry according to the invention, FIG. 2 shows a diagram for viscosity versus shear rate for a manganomanganic oxide slurry according to the invention, FIG. 3 shows dynamic rheology for a manganomanganic oxide slurry according to the invention, and FIG. 4 shows dynamic rheology for another manganomanganic oxide slurry according to the present invention.

DETAILED DESCRIPTION OF THE INVENTION

The invention may be carried into practice in various ways and will now be illustrated in the following specific description and Examples.

Example 1

Stability

In order to examine the stability of a slurry according to the invention, a slurry was made up comprising water, 90 wt % manganomanganic oxide particles having the properties set out in Table 1, 0.07 wt % by the weight of slurry of Antiprex A as a dispersant, and NaOH as a pH regulator in a quality sufficient to establish an initial pH of 10.5 The desired amount of dispersant and sodium hydroxide was added in advance prior to adding manganomanganic oxide powder.

The viscosity of the slurry and its pH were monitored over a period of 6 months and the results are shown in FIG. 1. As can be seen, during storage for 6 months, the slurry dispersion showed good stability.

The rheological properties were measured using a MCR101 Physica rheometer from Antor Paar GmbH with Couette geometry (CC27). The temperature was controlled to 20° C. The flow and dynamic rheology measurements were recorded. The shear regime applied in this test was ramping up the shear rate from zero to 1000 s-1 and then back to zero shear rate and repeat the same profile once more. The overlap of all the curves (up and down) and the very small hysteresis loop as shown in FIG. 2 indicate that the slurry recover its rheological properties rapidly. The dynamic curve (viscoelasticity) as shown in FIGS. 3 and 4 indicate a gel network formation (G'>>G"). The magnitude of the storage (elastic) modulus G' is depending of the number of interactions between the components in the slurry and the strength of each interaction. Such week network is sufficient to keep the large particles suspended in the dispersion and avoid settling of such particles.

Example 2

Viscosity

The range of viscosities was investigated.

Rheological properties were measured using a MCR101 Physica rheometer with parallel plate geometry (CC27). The temperature was controlled to 20° C. Flow and dynamic rheology measurements were recorded. The lowest viscosity achieved with using dispersant and pH adjustment was 300 mPa·s at shear rate of 20 s$^{-1}$ measured by Physica rheometer.

It is known that a low viscosity in a dispersion enhances the settling rate of large particles.

It was observed that a viscosity in the range 300 to 1000 mPa·s at shear rate of 20 s$^{-1}$ is an optimal range for $Mn_3O_4$ slurry, to reduce the sedimentation tendency of large particles while allowing the slurry to remain flowable and pumpable. Therefore, the amount of dispersant and the pH value was adjusted to obtain manganomanganic oxide slurry with a viscosity in the range of 300 to 1000 mPa·s at a shear rate of 20 s$^{-1}$. Examples of the shear viscosity as function of the shear rate of two manganomanganic oxide slurries prepared with two different dispersants is shown in FIG. 2.

The dynamic rheology measurement demonstrated that in a static condition, the slurry exhibits a weak gel structure (gel network) that helps in suspending the heavy large particles (>45 μm) of manganomanganic oxide, as shown in FIGS. 3 and 4. As shown in FIG. 3, as an example, the storage (elastic) modulus (G') of 10000 Pa is greater than and the loss (viscous) modulus (G") at low strain <0.1%, meaning that the system exhibits a gel structure that breaks at the cross over point at a strain of 0.46%.

Example 3

Oil Well Cement

A cement test using manganomanganic oxide slurry according to the invention was conducted according to the API 10 standard. The following composition shown in Table 2 was used to prepare cement slurry with a density of 2.2 g/ml;

TABLE 2

Composition of oil well cement containing manganomanganic oxide slurry and powder as reference.

|  | Amount in grams | |
| --- | --- | --- |
| Component | Micromax L | Micromax dry |
| Water | 145 | 177.9 |
| Microblock ® slurry | 124.3 | 124.3 |
| Micromax L | 328.8 | — |
| Micromax dry | — | 296.0 |
| Dispersant | 18.4 | 18.4 |
| Fluid loss additive | 34.5 | 34.5 |
| Retarder | 2.8 | 2.8 |
| Silica flour | 172.2 | 172.2 |
| G-cement | 493.4 | 493.4 |
| Total | 1320 | 1320 |

Micromax L is a slurry in accordance with the invention, comprising 90 wt. % manganomanganic by the weight of slurry, 0.08 wt.-% Antiprex A by the weight of slurry and 0.25 wt. % sodium hydroxide by the weight of slurry.

Micromax dry is manganomanganic oxide, in powder form.

Microblock® slurry is a slurry of water and amorphous silica powder produced by Elkem AS.

The following equipment was used to prepare and characterise the cement slurry:

Chandler fann 35 rheometer with thermo-cup, consistometer, equipment for measuring fluid loss (HTHP), constant-speed warring mixer, 200-250 ml measuring cylinder and precision balance.

The results set out in Table 3 show that the rheological properties of the two cement slurries measured at 60° C. are quite similar with relatively low plastic viscosity for the cement slurry containing manganomanganic oxide slurry. That can be related to the excess of dispersant in that cement slurry. The fluid loss is relatively higher for the cement with manganomanganic oxide slurry, but that can be optimised to the desired value by adjusting the amount of the fluid loss additive and/or the dispersant.

TABLE 3

Viscosity and fluid loss of oil well cement measured at 60° C.

| Viscosity reading | Micromax L | Micromax dry |
| --- | --- | --- |
| 300 rpm | 33 | 37 |
| 200 rpm | 23 | 26 |
| 100 rpm | 14 | 15 |
| 6 rpm | 2 | 2.5 |
| 3 rpm | 1 | 2 |
| Plastic viscosity (cp) | 28.5 | 33 |
| Yield point (lb/ft2) | 4.5 | 4 |
| Fluid loss (ml) | 77 | 50 |
| Fee water (mm) | 0 | 0 |
| Filter cake (mm) | 42 | 25 |

Example 4

Drilling Fluid

This Example investigates the use of manganomanganic oxide slurry in water-based drilling fluids As shown in Table 4, a water based fluid with a density of 2.1 kg/l was prepared using manganomanganic oxide slurry. The mixing was achieved without difficulty. The rheology of the fluids before and after hot aging was quite similar, indicating good fluid stability. The fluid loss measured at 150° C. showed good performance. The results were also comparable with fluid containing manganomanganic oxide powder

TABLE 4

Composition of water based drilling fluid containing manganomanganic oxide slurry. Total density is 2.1 g/ml.

| Materials | Amount in gram | Mixing time (min) | Mixing speed (prm) |
| --- | --- | --- | --- |
| Fresh water | 494 | | |
| NaHCO3 | 5 | 2 | 4000 |
| Micromax-L | 1289 | 5 | 4000 |
| CaCO3 medium | 50 | 2 | 4000 |
| CaCO3 fine | 25 | 2 | 4000 |
| Viscosifier and fluid loss additive | 20 | 5 | 4000 |
| Dispersant | 4 | 5 | 4000 |
| Fluid loss additive | 7 | 5 | 4000 |

Micromax-L is a slurry according to the invention having the same composition as the slurry used in Example 3.

TABLE 5

Properties of the water based drilling fluids of Table 4 containing manganomanganic oxide slurry, before and after static hot ageing at 150° C. for 16 hours. Total density is 2.1 g/ml.

| Test Results | | | Before ageing | After ageing |
| --- | --- | --- | --- | --- |
| TEMPERATURE/° C. | | ° C. | | 150 |
| PERIOD STATIC AGED | | Hours | | 16 |
| RHEOLOGY: Temp/° C. | | | 20° C. | 20° C. |
| | 600 rpm | | 108 | 103 |
| | 300 rpm | | 69 | 66 |
| | 200 rpm | | 54 | 51 |
| | 100 rpm | | 36 | 34 |
| | 6 rpm | | 13 | 10 |
| | 3 rpm | | 11 | 8 |
| | Gels 10" | lb/100 ft2 | 12.5 | 8 |
| | Gels 10' | lb/100 ft2 | 33 | 8 |
| | Plastic viscosity | cP | 39 | 37 |
| | Yield point | lb/100 ft2 | 30 | 29 |
| FILTRAT | Temperature | ° C. | 150 | 150 |
| | HTHP Fluid Loss | mL water | | 20 |
| | Filter cake | mm | | 5 |
| SAG TEST | Supernatant Liquid | mL | | 18 |
| | Density-Top | g/cm3 | | 2 |
| | Density Bottom | g/cm3 | | 2.15 |
| | Sag Factor | | | 0.518 |

The equipment used for this test:

Chandler fann 35 rheometer with thermo-cup, equipment for measuring fluid loss (HTHP), constant-speed warring mixer, high pressure oven, hot aging cell and precision balance.

The filtration and sag tests are not important for a fresh slurry at room temperature since the drilling fluids are always used at elevated temperatures. The values after hot aging are of great importance to judge the mud performance and stability.

Table 5 shows that;

A) The water based drilling fluid formulated with manganomanganic oxide slurry in accordance with the invention exhibits good thermal stability. The viscosity data before and after hot aging shows a thermal stable fluid.

B) The low sag and fluid loss after hot aging indicate that the manganomanganic oxide is well dispersed in the drilling fluid.

The invention claimed is:

1. A stable, non-settling slurry comprising:
water;
manganomanganic oxide particles having a particle size below 10 μm, the manganomanganic oxide particles present in the slurry in an amount up to 92 wt % based on the weight of the slurry;
a dispersant in an amount of 0.05 to 0.5 wt % based on the weight of dry manganomanganic oxide particles in the slurry, the dispersant having a molecular weight between 500 and 50,000 g/mol and selected from an ethoxylated polycarboxylate and a polyacrylic acid salt; and
a ph of the slurry being 9 to 11.

2. The slurry of claim 1, wherein the amount of the manganomanganic particles present in the slurry is greater than 80 wt % based on the weight of the slurry.

3. The slurry of claim 1, wherein the amount of the dispersant is 0.07 to 0.15 wt % based on the weight of dry manganomanganic oxide particles.

4. The slurry of claim 1, wherein:
the dispersant is a polyacrylic sodium salt having a molecular weight of about 3000 g/mol.

5. The slurry of claim 1, wherein:
the dispersant is an ethoxylated polycarboxylate; with a hydrophobic chain as a side chain.

6. The slurry of claim 1, wherein:
the ethoxylated polycarboxylate has a molecular weight of about 20,000 g/mol.

7. The slurry of claim 1, wherein:
the ph of the slurry is 9.5 to 10.5.

8. The slurry of claim 1, wherein the ph of the slurry is adjusted using sodium hydroxide.

9. A method of producing a stable, non-settling aqueous slurry of manganomanganic oxide, comprising:
Mixing manganomanganic oxide particles, water and a dispersant to form a slurry, wherein the manganomanganic oxide particles have a particle size below 10 and are presentin an amount up to 92 wt % based on the weight of the slurry, the dispersant is present in an amount of 0.05 to 0.5 wt % based on the weight of the dry manganoanganic oxide particles present in the slurry, the dispersant is selected from an ethoxylated polycarboxylate and a polyacrylic acid salt; and the dispersant has a molecular weight of 500 to 50,000 g/mol; and
adjusting the ph of the slurry from 9 to 11.

10. The method of claim 9, wherein:
first, dispersant is added and mixed with the water;
second, sodium hydroxide is added and mixed with the dispersant and water mixture;
third, the manganomanganic oxide particles are added and mixed with the water, dispersant and sodium hydroxide mixture at a low rate of mixing;
fourth, after adding all of the manganomanganic oxide particles to the water, dispersant and sodium hydroxide mixture, a high rate of shear is applied to the water, dispersant, sodium hydroxide and manganomanganic oxide particle mixture to form the slurry.

11. The method of claim 9 wherein:
the ph of the slurry is adjusted with sodium hydroxide.

12. The method of claim 9, further comprising:
pumping the slurry through a sieve system to remove coarse particles having a diameter greater than 45 μm from the slurry, after the slurry has been prepared.

13. An oil well cement composition comprising cement powder, water and the slurry of claim 1.

* * * * *